(12) United States Patent
Mondelli et al.

(10) Patent No.: US 7,798,235 B2
(45) Date of Patent: Sep. 21, 2010

(54) SAFETY VALVE TORSIONAL SPRING ASSEMBLY AND METHOD

(75) Inventors: Maximiliano Mondelli, Houston, TX (US); Robert Jancha, Humble, TX (US); Robert Henschel, Woodlands, TX (US)

(73) Assignee: BJ Services Company LLC, Houston, TX (US)

( * ) Notice: Subject to any disclaimer, the term of this patent is extended or adjusted under 35 U.S.C. 154(b) by 0 days.

(21) Appl. No.: 12/056,503

(22) Filed: Mar. 27, 2008

(65) Prior Publication Data

US 2009/0242209 A1 Oct. 1, 2009

(51) Int. Cl.
*E21B 34/06* (2006.01)
(52) U.S. Cl. .................. 166/373; 166/332.8; 137/527; 137/527.6
(58) Field of Classification Search .................. 175/316, 175/332.8; 137/527, 527.6; 251/298, 228
See application file for complete search history.

(56) References Cited

U.S. PATENT DOCUMENTS 4,531,587 A 7/1985 Fineberg ..................... 166/332
4,781,214 A * 11/1988 Scaramucci ................. 137/527
6,328,062 B1 12/2001 Williams et al. ......... 137/527.2
6,851,477 B2 * 2/2005 Hill et al. .................. 166/332.8
6,866,245 B2 * 3/2005 Deaton ....................... 251/303

FOREIGN PATENT DOCUMENTS

GB 2345742 8/2003
GB 2395212 5/2006

OTHER PUBLICATIONS

British Combined Search and Examination Report for corresponding British Patent Application No. 0904179.9, filed Mar. 11, 2009.

* cited by examiner

*Primary Examiner*—Kenneth Thompson
*Assistant Examiner*—James G Sayre
(74) *Attorney, Agent, or Firm*—Howrey LLP

(57) ABSTRACT

A safety valve assembly comprises a valve body, a flapper mount, flapper and a hinge used to rotate the flapper in an opened or closed position. Torsional pins are mounted adjacent the flapper mount, each having ends which extend into the hinge and terminating adjacent each other at a location along the hinge. Torsional springs are circumferentially mounted around the torsional pins. Tabs extend from the torsional springs and contact an actuation member extending over the top of the flapper. As such, the torque created by the torsional springs is transferred to the actuation member via the tabs, thereby reducing the stress on the torsional springs.

15 Claims, 3 Drawing Sheets

SAFETY VALVE TORSIONAL SPRING ASSEMBLY AND METHOD

BACKGROUND OF THE INVENTION

1. Field of the Invention

The present invention relates generally to safety valves used in oil and gas wellbores and, more particularly, to a torsional safety valve mechanism used to affix and maintain the flapper in a closed position.

2. Description of the Related Art

The use of safety valves in oil and gas wellbores is well known in the art. In general, these valves are used as redundant shut-offs in the event of wellbore emergency. These valves typically consist of a flapper which is pivotally connected to a tubular member via a hinge. During fluid production, a sleeve is generally used to actuate the flapper in an open position, allowing fluid to pass through. However, in the event of an emergency or other event, the flapper can be closed, preventing dangerous fluids from traveling up hole to the surface and being released into the environment.

In the past, various manufacturers have used steel pins, called flapper pins, to connect the flapper to the hinge on a mating part of the tubular member called a hard seat. Once the flapper is placed on the hinge, a set of radially contoured pins are placed on either side of the flapper to support the torsion springs. The torsion springs circumferentially wrap around the pins and are used to bias the flapper in a closed position. Tabs extend from the torsion springs out over the flapper, contacting the flapper, thereby transferring the spring torque to the flapper and biasing it in the closed position.

There are disadvantages to the traditional flapper mechanism design. First, since the tabs form an integral part of the springs, the torque stresses created by the spring's movement when the flapper is opened is transferred along the spring itself, increasing the likelihood of stress fractures and spring failure. The torque stresses are typically the greatest at the location where the tab and spring portions join. Second, when using a contoured flapper, the tabs extending from the springs often slide along or off the flapper surface when it is actuated in the opened positioned. This decreases valve efficiency and creates additional stresses on the spring, which results in combined loading and increased fatigue stresses along the spring and flapper surface. In those designs where the tabs connect with each other over the flapper surface, even more fatigue stress is created at the tab/spring junction. Third, the use of the individual flapper pin is unduly complicated and increases the cost associated with the safety valve.

In view of these disadvantages, there is a need in the art for an improved flapper mechanism which minimizes the torque stresses on the torsion springs and simplifies the flapper design, thereby providing a more reliable and cost-efficient safety valve.

SUMMARY OF THE INVENTION

Various embodiments of the present invention provide assemblies and methods for a safety valve torsional spring assembly used in a wellbore. The safety valve comprises a valve body, a flapper mount and a flapper. A hinge is used to rotate the flapper in an opened or closed position. Torsional pins are mounted adjacent the flapper mount, each having ends which extend into the hinge and terminating adjacent each other at a location along the hinge. Torsional springs are circumferentially mounted around the torsional pins. Tabs extend from the torsional springs and contact an actuation member extending over the top of the flapper. As such, the torque created by the torsional springs is transferred to the actuation member via the tabs, thereby reducing the stress on the torsional springs.

According to another embodiment of the present invention, the torsional pins terminate adjacent one another at the middle of the hinge or at a point offset from the middle of the hinge. Moreover, the actuation member may be a "U" shaped horse shoe member. An alternative embodiment of the actuation member may include two tabs connected to the torsional pins, which extend out over the top of the flapper.

An exemplary method of the present invention includes the steps of opening the flapper, the valve assembly comprising springs and an actuation member adapted to actuate the flapper into a closed position; generating torque in the springs; transferring the torque from the springs to the actuation member, the actuation member being in contact with the flapper; transferring the torque from the actuation member to the flapper; and closing the flapper.

The foregoing summary is not intended to summarize each potential embodiment or every aspect of the subject matter of the present disclosure. Other objects and features of the invention will become apparent from the following description with reference to the drawings.

Figure 1:
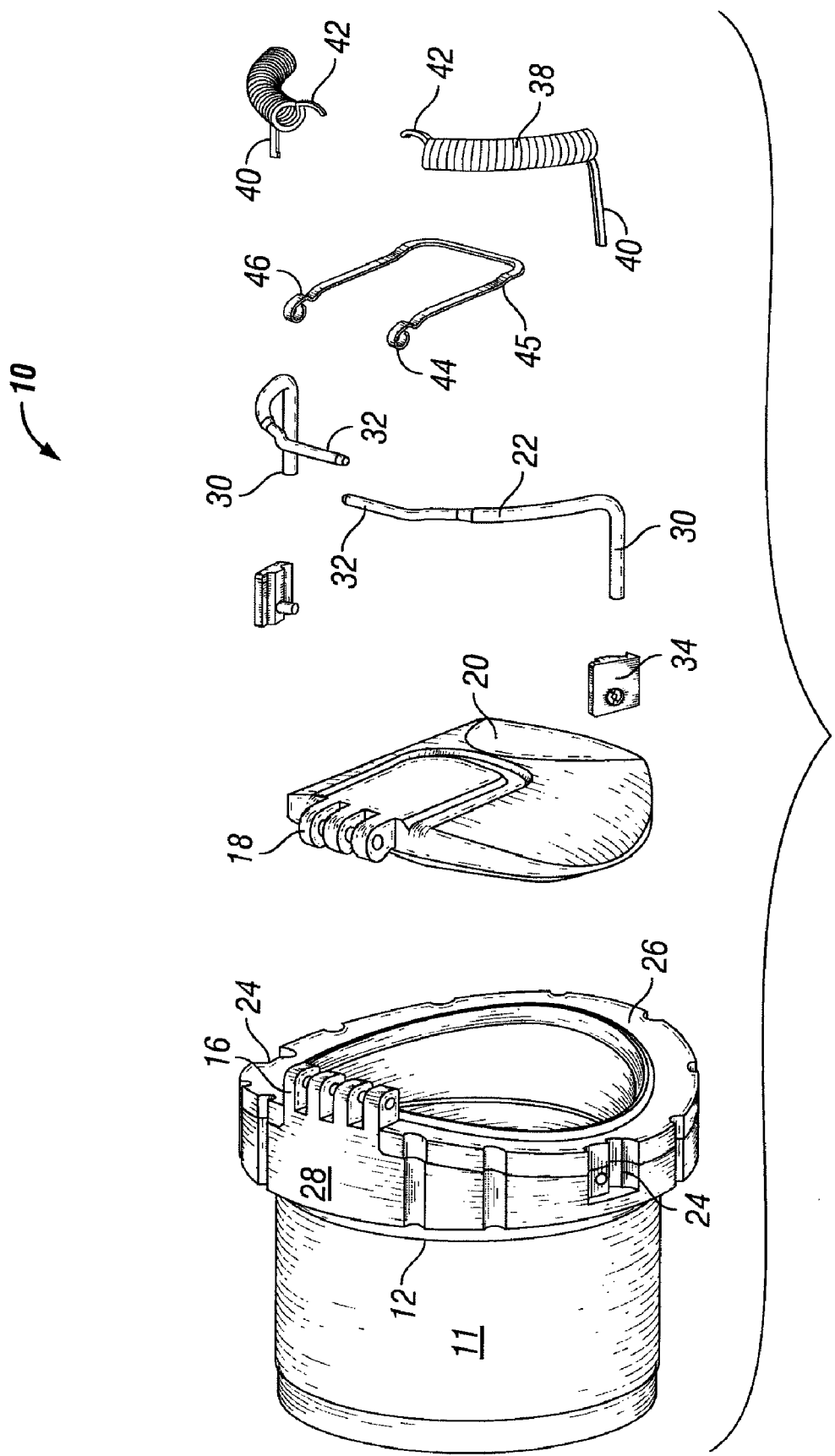
FIG. 1 illustrates various components of a safety valve mechanism according to an exemplary embodiment of the present invention.

While the invention is susceptible to various modifications and alternative forms, specific embodiments and methods have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the use of a safety valve. In the interest of clarity, not all features of an actual implementation or related method are described in this specification. It will of course be appreciated that in the development of any such actual embodiment or method, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
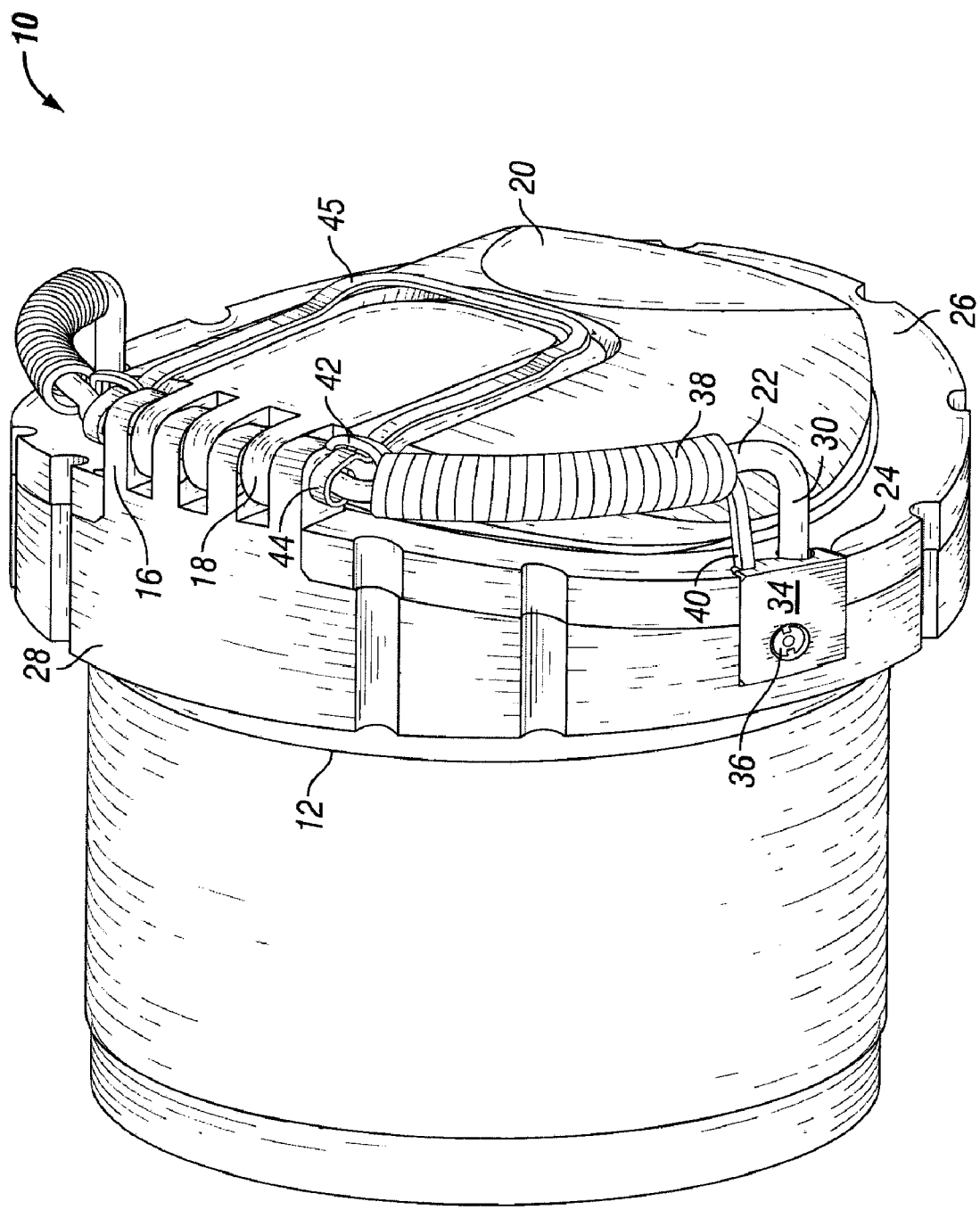
FIG. 2 illustrates the assembled safety valve mechanism of FIG. 1.

Referring to FIGS. 1 & 2, a safety valve 10 is illustrated according to an exemplary embodiment of the present invention. Safety valve 10 can be a variety of safety valves used in downhole applications, such as, for example, a surface controlled sub-surface safety valve, annular controlled valve, fluid loss valve or pressure balanced valves. Safety valve 10 includes a tubular member 11 having a flapper mount 12 at its lower end 14. Flapper mount 12 includes a bottom surface 26 and lateral surface 28. A seat hinge 16 extends from flapper mount bottom surface 26 and mates with flapper hinge 18 of flapper 20. Two shoulders 24 are located on lateral surface 28, which have profiles for accepting torsional pins as will be discussed.

Two mirrored radially contoured torsional pins 22, having ends 30,32, extend around the curvature of flapper mount bottom surface 26. Ends 30 are placed within the mating profile of shoulder 24, while ends 32 are inserted into seat hinge 16 and flapper hinge 18, thereby effectively forming the hinge used to actuate and/or rotate flapper 20 in an open or closed position. Once ends 30 have been placed within the profile of shoulders 24, secure members 34 are placed atop ends 30. Secure members 34 are used to counter any torque generated by torsional springs 38 which may act on torsional pins 22. Secure members 34 have a matching profile which mates with the contour of ends 30 and the profile of shoulders 24. A connector 36, such as, for example, a screw, is inserted into secure members 34 in order to create the connection. Those skilled in the art having the benefit of this disclosure realize a variety of connectors and/or methods of mounting torsional pins 22 to flapper mount 12 may be utilized.

Further referring to the exemplary embodiments of FIGS. 1 & 2, torsional springs 38 illustrated which provide the bias force necessary to close flapper 20. In order to support torsional springs 38, torsional pins 22 are placed inside of torsional springs 38. Torsional springs 38 circumferentially wrap around torsional pins 22 and have ends 40 and tabs 42, which mate with profiles in shoulders 24 (ends 40) and contact actuation member 45 (tabs 42) as will be discussed. Secure member 34 mates and fits on top of ends 30 and ends 40 in order to secure torsional springs 38 and pins 22 in place.

Actuation member 45 extends from the area adjacent hinges 16,18 and extends out over the surface of flapper 20. In the most preferred embodiment, actuation member 45 is shaped a "U" shaped "horse shoe" having ends 44, which are curved to fit around the outer diameter of ends 32 of torsional pins 22, essentially forming a hinge. As such, once ends 32 are inserted into hinge members 16,18, ends 44 are situated adjacent the edges of hinge member 16 as illustrated in FIG. 2. Actuation member 45 also includes mating grooves 46 adjacent ends 44, which provide a mating profile for tabs 42 of torsional springs 38. In the alternative, however, grooves 46 may be holes wherein tabs 42 are inserted. The holes would run from the top to bottom of actuation member 45, wherein spring tabs 42 could be hooked and/or inserted into. As flapper 20 opens, torque is created in torsional springs 38, which is then transferred to actuation member 45 via tabs 42 in order to bias flapper 20 in a closed position. Accordingly, the torque stress on tabs 42 of springs 38 is minimized.

Actuation member 45 allows the torque created by torsional springs 38 to be more uniformly distributed over flapper 20. Moreover, the U-shape of horse shoe 45 prevents sliding along and/or sliding off the surface of flapper 20, thereby providing a more reliable flapper mechanism. Please note, however, those skilled in the art having the benefit of this disclosure realize a variety of designs may be utilized to transfer the spring torque to flapper 20, such as, for example, actuation member 45 may be a "V" shaped member or may consist of two individual tab members extending over the top of flapper 20.

Figure 3:
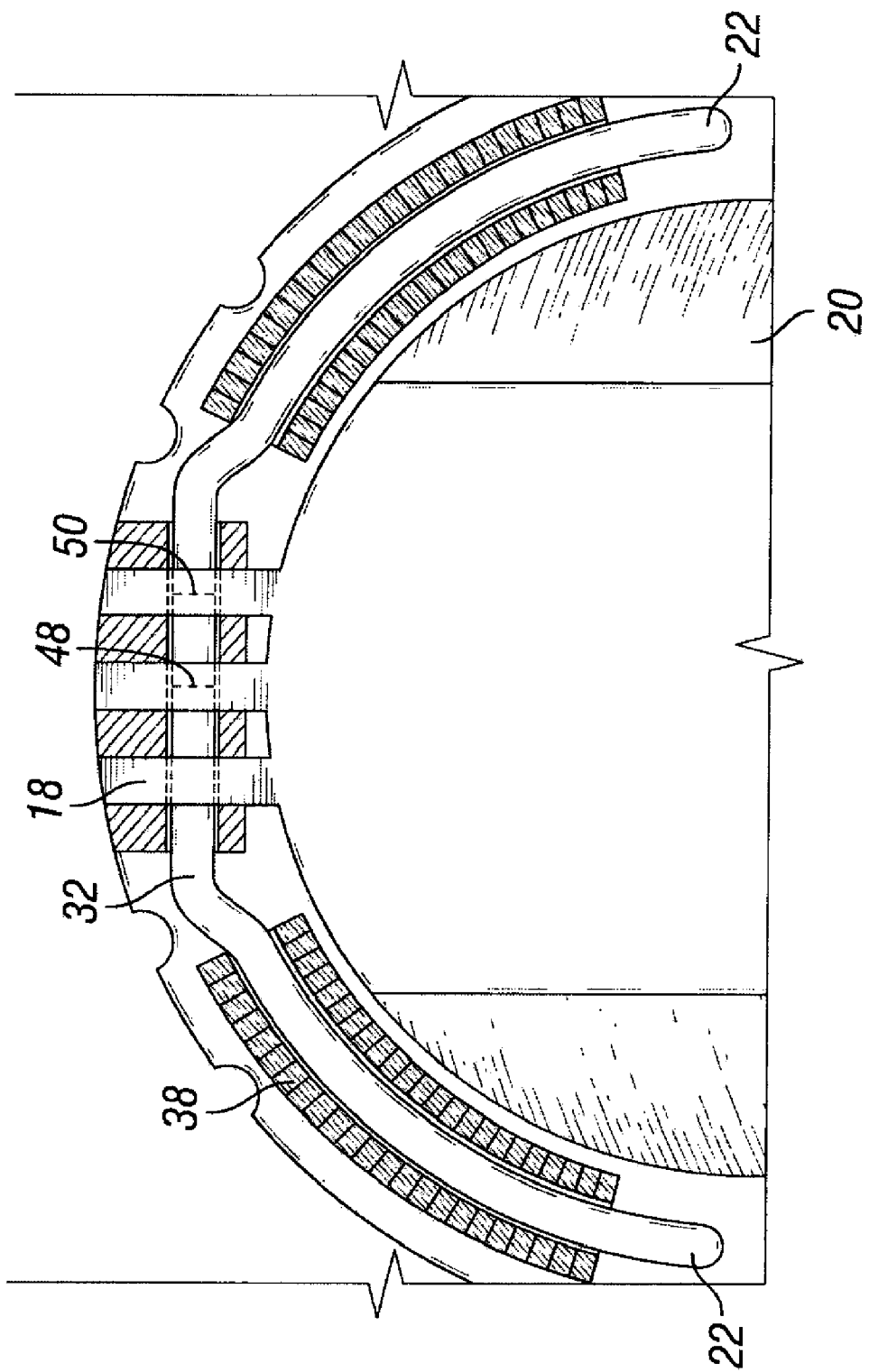
FIG. 3 is a cross-sectional view of a safety valve mechanism according to an exemplary embodiment of the present invention.

Referring to the exemplary embodiment of FIG. 3, the ends 32 of torsional pins 22 are straight ends which insert inside hinges 16,18 and come together at the dotted line 48, which denotes the middle of hinges 16,18. In the alternative, however, ends 32 may meet at an offset position along hinges 16,18, as, for example, denoted by dotted line 50. As such, if the alternative embodiment were employed, one end 32 would be longer than the other end 32. Accordingly, the use of extended torsional pins 22 in the present invention alleviates the need for an individual flapper pin as utilized in the prior art.

The exemplary embodiment of the present invention includes a method for actuating a valve assembly in a wellbore, the valve assembly comprising a flapper hingedly attached to a flapper mount, the method comprising the steps of opening the flapper, the valve assembly comprising springs and an actuation member adapted to actuate the flapper into a closed position; generating torque in the springs; transferring the torque from the springs to the actuation member, the actuation member being in contact with the flapper; transferring the torque from the actuation member to the flapper; and closing the flapper.

Accordingly, the flapper mechanism of the present invention has a number of advantages over the prior art. First, since the spring tabs to do not contact the flapper, the stresses applied to the springs are minimized. Second, the actuation member more uniformly distributes the load stresses over the flapper. Third, various embodiments of the actuation member prevent the actuation member from sliding along and/or off the flapper, further minimizing the stress applied to the springs. Moreover, the torsional pins eliminated the necessity for the flapper pin of the prior art.

Although various embodiments have been shown and described, the invention is not so limited and will be understood to include all such modifications and variations as would be apparent to one skilled in the art. For example, an alternative embodiment of the present invention could be a valve which only utilizes the actuation member and spring tabs, while still employing the prior art torsion and flapper pins. Accordingly, the invention is not to be restricted except in light of the attached claims and their equivalents.

What is claimed is:

1. A valve assembly for use in a wellbore, the valve assembly comprising:
    a valve body;
    a flapper mount on the valve body;
    a flapper;
    a hinge used to rotate the flapper in an opened or closed position;
    a first and second torsional pin mounted adjacent the flapper mount, the first and second torsional pins each comprising an end which extends into the hinge;
    a first torsional spring mounted around the first torsional pin and a second torsional spring mounted around the second torsional pin, the first and second torsional springs each comprising a tab member adjacent the hinge; and
    an actuation member connected to the first and second torsional pins and extending onto the flapper, the tab members of the first and second torsional springs contacting the actuation member.

2. A valve assembly as defined in claim 1, wherein the ends of the first and second torsional pins extending into the hinge terminate adjacent each other at a location in a middle of the hinge.

3. A valve assembly as defined in claim 1, wherein the ends of the first and second torsional pins extending into the hinge terminate adjacent each other at a location offset from a middle of the hinge.

4. A valve assembly as defined in claim 1, wherein the actuation member comprise grooves or holes which mate with the tab members of the first and second torsional springs.

5. A valve assembly as defined in claim 1, wherein the actuation member is a "U" shaped horse shoe.

6. A valve assembly as defined in claim 1, wherein the actuation member comprises a first tab member connected to the first torsional pin and a second tab member connected to the second torsional pin, the first and second tab members extending onto the flapper.

7. A valve assembly for use in a wellbore, the valve assembly comprising:
- a valve body;
- a flapper mount on the valve body;
- a flapper;
- a hinge used to rotate the flapper;
- a first and second pin mount d adjacent the flapper mount;
- a first spring mounted adjacent the first pin and a second spring mounted adjacent the second pin; and
- a separate actuation member extending onto the flapper, the separate actuation member being connected to at least one of the first or second pins.

8. A valve assembly as defined in claim 7, wherein the first and second springs each comprise a tab member which contacts the actuation member.

9. A valve assembly as defined in claim 8, wherein the separate actuation member comprises a first tab member connected to the first pin and a second tab member connected to the second pin, the first and second tab members of the separate actuation member extending onto the flapper.

10. A valve assembly for use in a wellbore, the valve assembly comprising:
- a valve body;
- a flapper mount on the valve body;
- a flapper;
- a hinge used to rotate the flapper;
- a first and second pin mounted to the valve adjacent the flapper mount;
- a first spring mounted adjacent the first pin and a second spring mounted adjacent the second pin, the first and second springs each comprising a tab member; and
- an actuation member extending onto the flapper, the tab members of the first and second springs contacting the actuation member.

11. A valve assembly as defined in claim 10, wherein the first and second pins each comprise an end which extends into the hinge.

12. A method for actuating a valve assembly in a wellbore, the valve assembly comprising a flapper hingedly attached to a flapper mount, the method comprising the steps of:
- (a) opening the flapper, the valve assembly comprising springs and a separate actuation member adapted to actuate the flapper into a closed position;
- (b) generating torque in the springs;
- (c) transferring the torque from the springs to the separate actuation member, the separate actuation member being in contact with the flapper;
- (d) transferring the torque from the separate actuation member to the flapper; and
- (e) closing the flapper.

13. A method as defined in claim 12, wherein step (c) is accomplished by the step of transferring the torque through a tab member.

14. A method for actuating a valve assembly in a wellbore, the valve assembly comprising a flapper hingedly attached to a flapper mount, the method comprising the steps of:
- (a) opening the flapper, the valve assembly comprising a separate actuation member adapted to actuate the flapper into a closed position;
- (b) mounting a first and second spring adjacent a hinge used to rotate the flapper, the first and second springs comprising a tab member;
- (c) transferring torque from the springs to the actuation member via the tab members; and
- (d) closing the flapper.

15. A method as defined in claim 14, wherein step (b) further comprises the step of mounting a first and second pin adjacent the hinge.

* * * * *

UNITED STATES PATENT AND TRADEMARK OFFICE
CERTIFICATE OF CORRECTION

| | | |
|---|---|---|
| PATENT NO. | : 7,798,235 B2 | Page 1 of 1 |
| APPLICATION NO. | : 12/056503 | |
| DATED | : September 21, 2010 | |
| INVENTOR(S) | : Mondelli et al. | |

It is certified that error appears in the above-identified patent and that said Letters Patent is hereby corrected as shown below:

Col. 5, lines 11-22, claim 7 should read

7. A valve assembly for use in a wellbore, the valve assembly comprising:
a valve body;
a flapper mount on the valve body;
a flapper;
a hinge used to rotate the flapper;
a first and second pin mounted adjacent the flapper mount;
a first spring mounted adjacent the first pin and a second spring mounted adjacent the second pin; and
a separate actuation member extending onto the flapper, the separate actuation member being connected to at least one of the first or second pins.

Signed and Sealed this
Ninth Day of August, 2011

David J. Kappos
*Director of the United States Patent and Trademark Office*